(12) United States Patent
Kezuka et al.

(10) Patent No.: US 6,664,005 B2
(45) Date of Patent: Dec. 16, 2003

(54) BATTERY ELECTRODE AND NON-AQUEOUS ELECTROLYTE BATTERY EQUIPPED THEREWITH

(75) Inventors: Koichiro Kezuka, Miyagi (JP); Takahiro Endo, Miyagi (JP)

(73) Assignee: Sony Corporation, Tokyo (JP)

( * ) Notice: Subject to any disclaimer, the term of this patent is extended or adjusted under 35 U.S.C. 154(b) by 102 days.

(21) Appl. No.: 09/815,032

(22) Filed: Mar. 22, 2001

(65) Prior Publication Data

US 2002/0071987 A1 Jun. 13, 2002

(30) Foreign Application Priority Data

Mar. 22, 2002 (JP) ..................... P2000-084747

(51) Int. Cl.⁷ ............................. H01M 4/64; H01M 4/70
(52) U.S. Cl. ..................... 429/233; 429/94; 429/163; 29/2
(58) Field of Search ............... 429/233, 94, 231.95, 429/163; 29/2

(56) References Cited

U.S. PATENT DOCUMENTS 5,227,264 A * 7/1993 Duval et al. ............... 429/153
6,399,241 B1 * 6/2002 Hara et al. ................. 429/124

FOREIGN PATENT DOCUMENTS

| JP | 11 238500 | | 8/1999 | |
| JP | 11238500 A | * | 8/1999 | ............ H01M/2/26 |
| JP | 11 354103 | | 12/1999 | |
| JP | 11354103 A | * | 12/1999 | ............ H01M/4/02 |
| JP | 2000-077054 | | 3/2000 | |
| JP | 2000077054 A | * | 3/2000 | ............ H01M/2/22 |

* cited by examiner

Primary Examiner—Carol Chaney
(74) Attorney, Agent, or Firm—Sonnenschein, Nath & Rosenthal LLP

(57) ABSTRACT

A battery electrode that can be bent in any shape without deterioration in battery performance. The metal current collector of the battery electrode has cut lines. This battery electrode is used for the positive or negative electrode of a non-aqueous electrolyte battery. The length of the cut lines is such that the ratio of y/x is from 0.2 to 0.9, with y being the total length of cut lines, and x being the distance between two points at which the extension of the cut line crosses both edges of the current collector.

12 Claims, 5 Drawing Sheets

BATTERY ELECTRODE AND NON-AQUEOUS ELECTROLYTE BATTERY EQUIPPED THEREWITH

RELATED APPLICATION DATA

The present application claims priority to Japanese Application No. P2000-084747 filed Mar. 22, 2000, which application is incorporated herein by reference to the extent permitted by law.

BACKGROUND OF THE INVENTION

The present invention relates to a battery electrode which exhibits good flexibility while keeping its performance. The present invention relates also to a non-aqueous electrolyte battery.

The recent years have seen the appearance of a variety of portable electronic machines and equipment such as VTR with integrated camera, portable telephones, and portable computers. Efforts are being made to make them smaller in size and lighter in weight and to improve their performance. Such improved performance also needs high-performance portable power sources, such as batteries, particularly secondary batteries, among which are lithium ion batteries attracting attention.

Such batteries are required to have good electrical properties as well as good shape. In other words, there is a demand for a battery of new type which is flexible and can be fitted into a movable or curved part of an electronic machine.

Conventional batteries, however, are constructed such that battery elements are placed in a metal can and hence they hardly change in shape. By contrast, sheet-like batteries that employ a gel electrolyte or solid electrolyte can change in shape to a certain extent, but they are not sufficiently flexible because they have metal current collectors forming a bridge.

The above-mentioned sheet-like batteries can be bent by force for their change in shape. Bending, however, causes the positive and negative electrodes to separate from each other at the bent part, breaks balance between the positive and negative electrodes, and causes the active material to separate from the current collector. All this greatly deteriorates the battery performance.

SUMMARY OF THE INVENTION

The present invention has been proposed to address these problems. It is an object of the present invention to provide a battery electrode which can bend arbitrarily without causing the active material to peel off. It is another object of the present invention to provide a non-aqueous electrolyte battery which can change in shape without deteriorating the battery performance.

To achieve the above object, according to a first aspect of the present invention, there is provided a battery electrode including a sheet-like metal current collector and a layer of active material formed thereon, wherein at least the metal current collector has cut lines so as to be flexible.

According to a second aspect of the present invention, there is provided a non-aqueous electrolyte battery including a positive electrode, a negative electrode, and a non-aqueous electrolyte, wherein the positive electrode and/or negative electrode is constructed such that a layer of active material is formed on a sheet-like metal current collector and at least the metal current collector has cut lines so as to be flexible.

A non-aqueous electrolyte battery with a gel electrolyte employs a so-called bridge structure. In other words, it has the respective metal current collectors for the positive and negative electrodes placed one over the other with a gel electrolyte interposed between them to isolate stress.

The metal current collector can bend in itself; but it can hardly bend if used in bridge structure. The reason for this is the same as that a metal pipe cannot bend easily.

The battery electrode according to the present invention is easily flexible because the metal current collector has cut lines. Thus, the non-aqueous electrolyte battery can be easily bent even when it employs bridge structure.

DESCRIPTION OF THE PREFERRED EMBODIMENTS

The battery electrode and non-aqueous electrolyte battery according to the present invention will be described in more detail with reference to the accompanying drawings.

The battery electrode according to the present invention is used for the positive electrode or negative electrode of a lithium ion secondary battery with a gel electrolyte.

An explanation is given first of the lithium ion secondary battery with a gel electrolyte (or solid electrolyte) and then of its electrodes (positive and negative electrodes).

Figure 1:
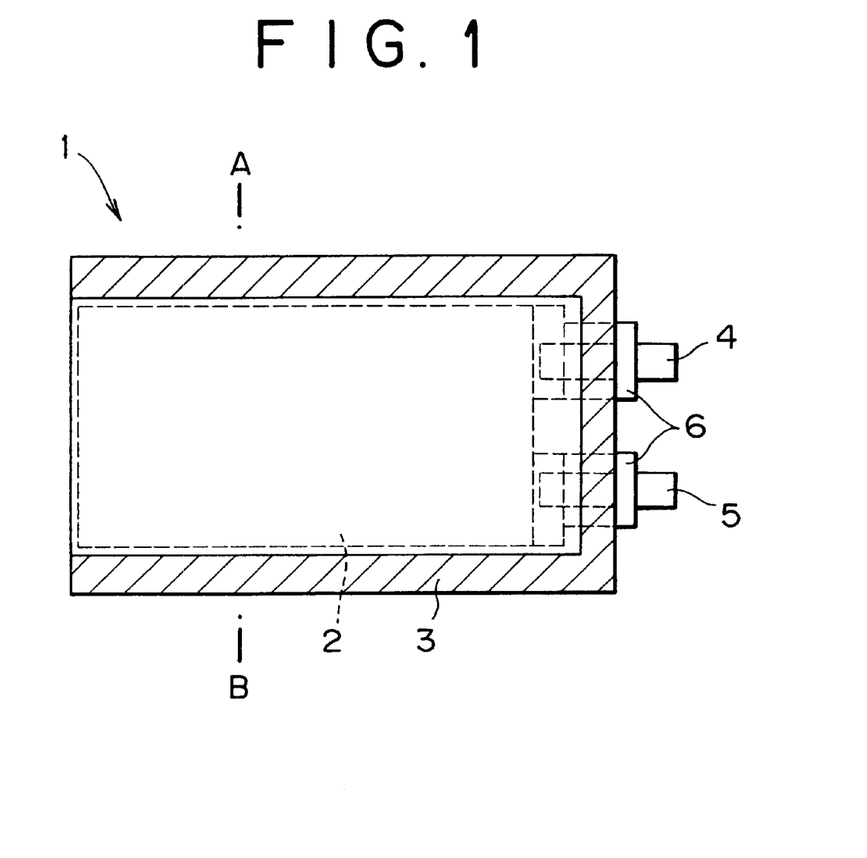
FIG. 1 is a schematic plan view showing the structure of a lithium ion secondary battery with a gel electrolyte.

The lithium ion secondary battery 1 with a gel electrolyte is shown in FIG. 1. It is made up an exterior package 3 and a battery element 2 contained therein. The exterior package 3 is a folded laminate sheet with its three sides sealed (hatched areas). The battery element 2 has the negative electrode with a lead 4 connected thereto and the positive electrode with a lead 5 connected thereto. The leads 4 and 5 extend outwards from the exterior package 3 through the insulating seal 6.

Figure 2:
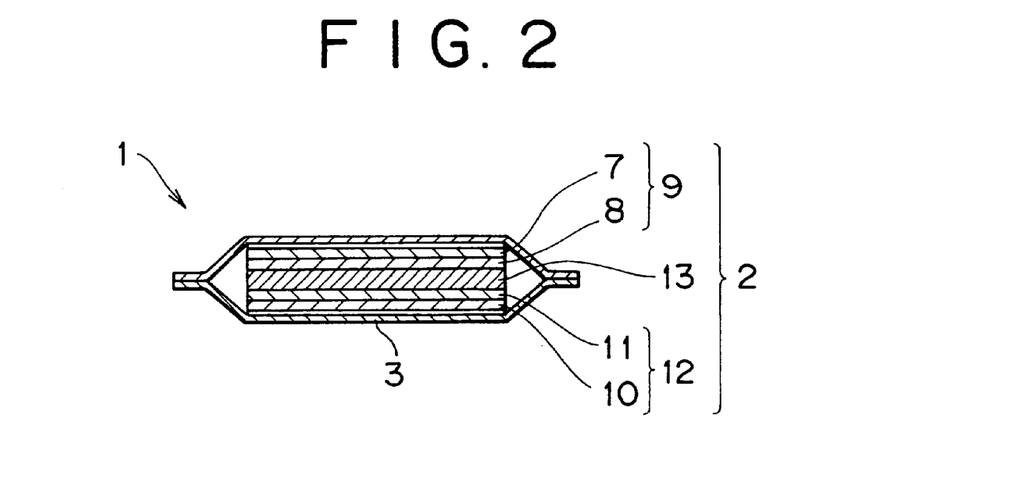
FIG. 2 is a schematic sectional view taken along the line A-B in FIG. 1.

As shown FIG. 2, the battery element 2 is composed of a negative electrode plate 9 and a positive electrode plate 12 which are placed one over the other, with a solid electrolyte or gel electrolyte 13 interposed between them.

The negative electrode plate 9 is composed of a negative electrode current collector 7 and a negative electrode active material 8 coated thereon. Likewise, the positive electrode plate 12 is composed of a positive electrode current collector 10 and a positive electrode active material 11 coated thereon.

The negative electrode plate 9 and the positive electrode plate 12 are integrally bonded together by heat fusion, compression bonding, or casting, with the gel electrolyte or solid electrolyte 13 interposed between them.

An explanation is given below of the battery electrode (the negative electrode plate 9 and the positive electrode plate 12) which is used in the battery constructed as mentioned above.

The negative electrode plate 9 has the negative electrode current collector 7 which is made of copper, nickel, stainless steel, or the like. Likewise, the positive electrode plate 12 has the positive electrode current collector 10 which is made of aluminum, nickel, stainless steel, or the like.

The negative electrode current collector 7 and positive electrode current collector 10 may be of any shape, such as foil, lath, expand metal, punched metal, net, or the like.

The layer of the negative electrode active material 8 is fixed onto the negative electrode current collector 7 by casting or sintering. Likewise, the layer of the positive electrode active material 11 is fixed onto the positive electrode current collector 10 by casting or sintering.

The solid electrolyte is formed by impregnating the layer of the negative electrode active material 8 or the layer of the positive electrode active material 11 with a solution of a polymeric compound and an electrolyte salt dissolved in a solvent (or a plasticizer for gel electrolyte) and solidifying the impregnated product by solvent removal. The solid electrolyte or gel electrolyte 13 formed on the layer of the negative electrode active material 8 or the layer of the positive electrode active material 11 is partly solidified in them.

According to the present invention, the current collector or the electrode including the current collector has cut lines at arbitrary several positions, so that it can be bent into any desirable shape.

The cut lines are basically made in the surface of the battery which comes into contact with a cylinder or cone around which the battery is wound. The cut lines may have a certain width.

Figure 3:
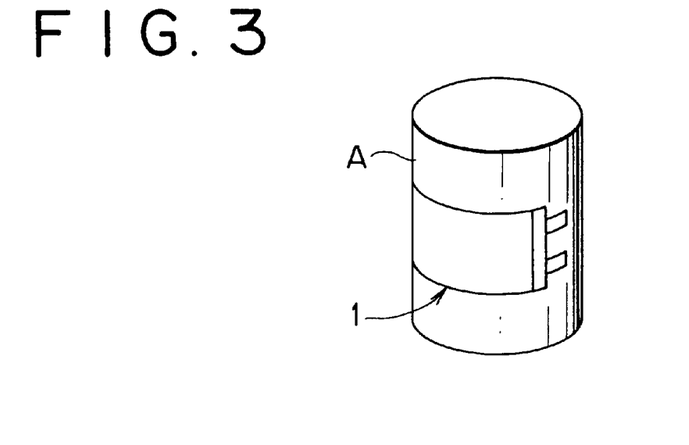
FIG. 3 is a schematic perspective view showing how a battery is wound around a cylinder.
Figure 4:
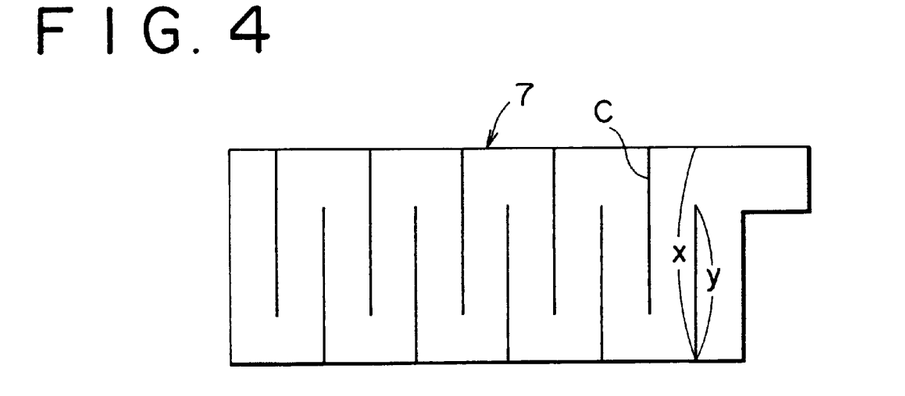
FIG. 4 is a schematic plan view showing a current collector having cut lines.
Figure 5:
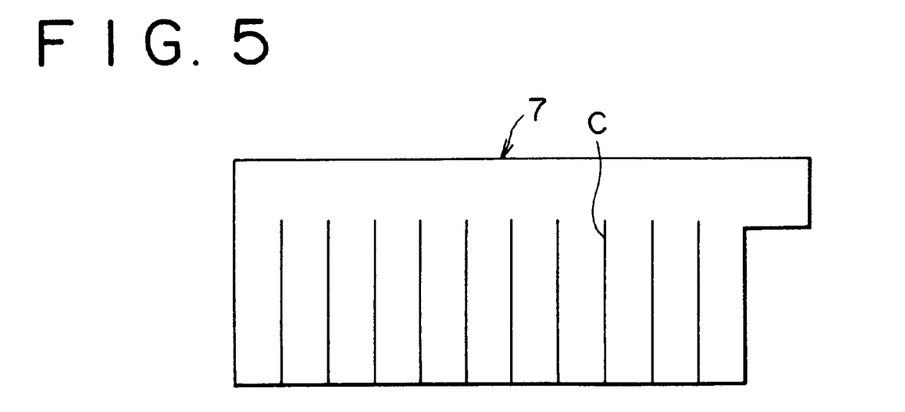
FIG. 5 is a schematic plan view showing another current collector having cut lines.

For example, if the non-aqueous electrolyte battery 1 is to be bent or wound around a cylinder A, as shown in FIG. 3, the cut lines C are made in the metal current collector 7 of the negative electrode plate 9, as shown FIG. 4 or 5. The cut lines extend halfway in the widthwise direction and are spaced at certain intervals in the lengthwise direction.

FIG. 4 shows an example in which the cut lines C extend alternately from both edges of the metal current collector 7. FIG. 5 shows an example in which the cut lines C extend from only one edge of the metal current collector 7.

Figure 6:
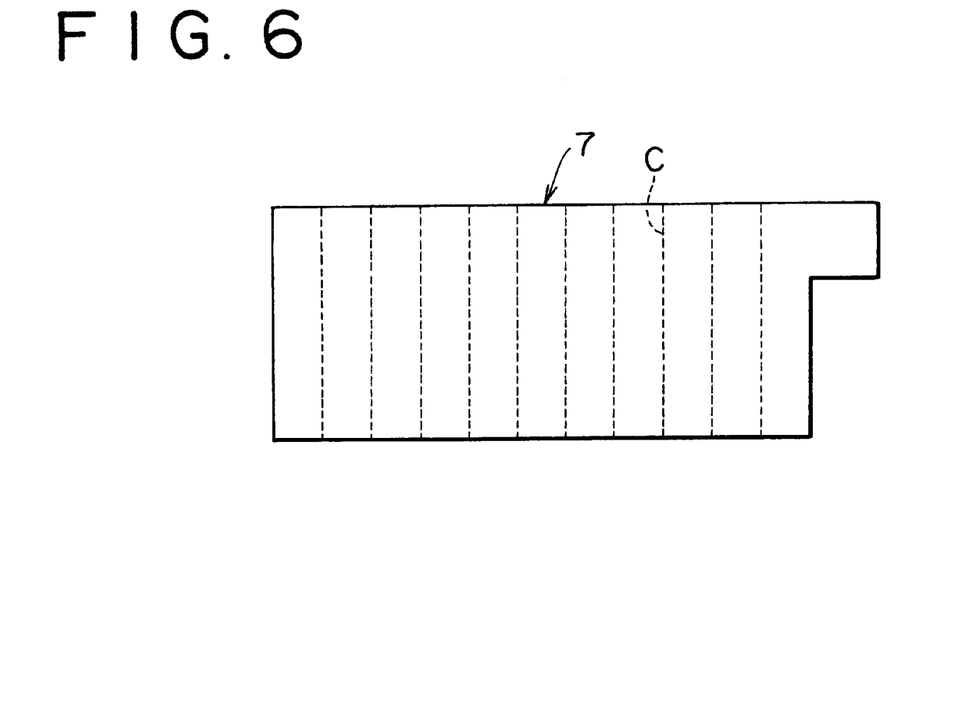
FIG. 6 is a schematic plan view showing a current collector having perforation-like cut lines.

The cut lines C are not necessarily continuous; they may be snatchy like perforation as shown in FIG. 6.

Figure 7:
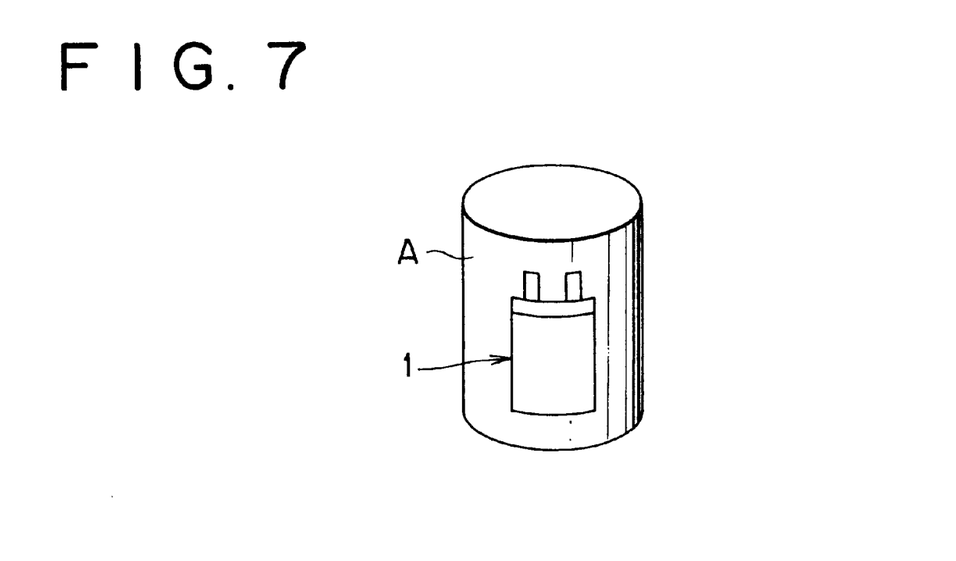
FIG. 7 is a schematic perspective view showing how another battery is wound around a cylinder.
Figure 8:
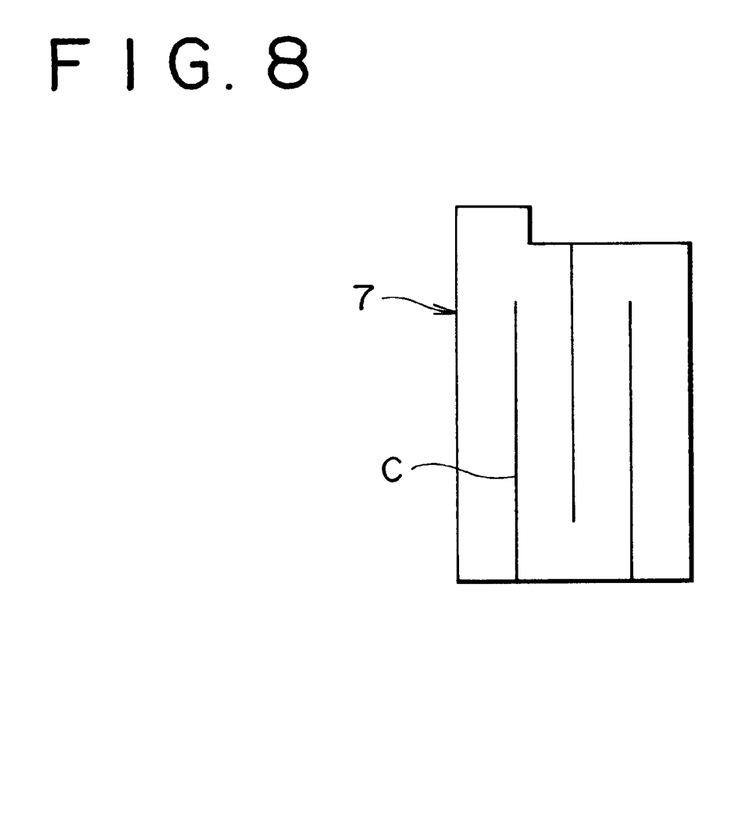
FIG. 8 is a schematic plan view showing how cut lines are made so that winding shown in FIG. 7 is accomplished.

In the case where the battery is wound in its widthwise direction around a cylinder A as shown in FIG. 7, the cut lines C are made in the metal current collector 7 such that they extend halfway in the lengthwise direction and are spaced at certain intervals in the widthwise direction, as shown in FIG. 8.

Figure 9:
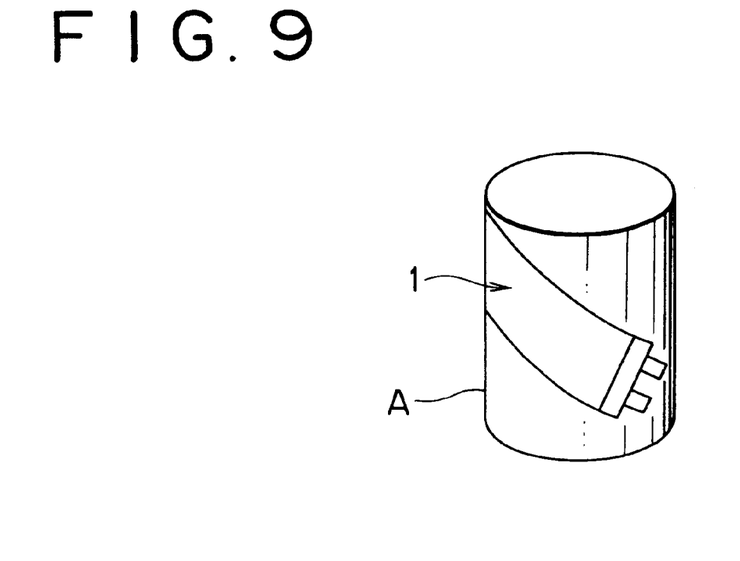
FIG. 9 is a schematic perspective view showing how further another battery is wound around a cylinder.
Figure 10:
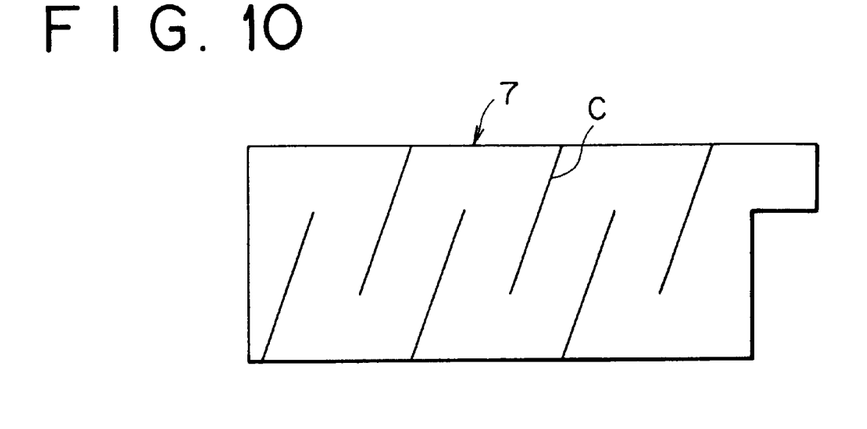
FIG. 10 is a schematic plan view showing how cut lines are made so that winding shown in FIG. 9 is accomplished.

FIG. 9 shows an example in which the battery is wound obliquely around a cylinder A. In this case, the cut lines C are made obliquely as shown in FIG. 10.

Figure 11:
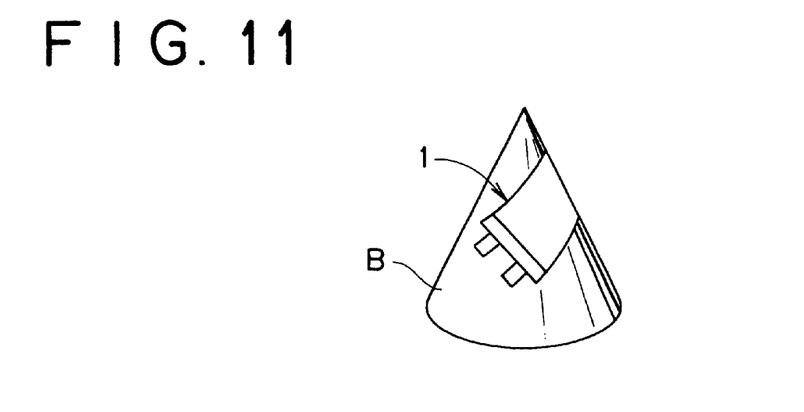
FIG. 11 is a schematic perspective view showing how a battery is wound around a cylinder.
Figure 12:
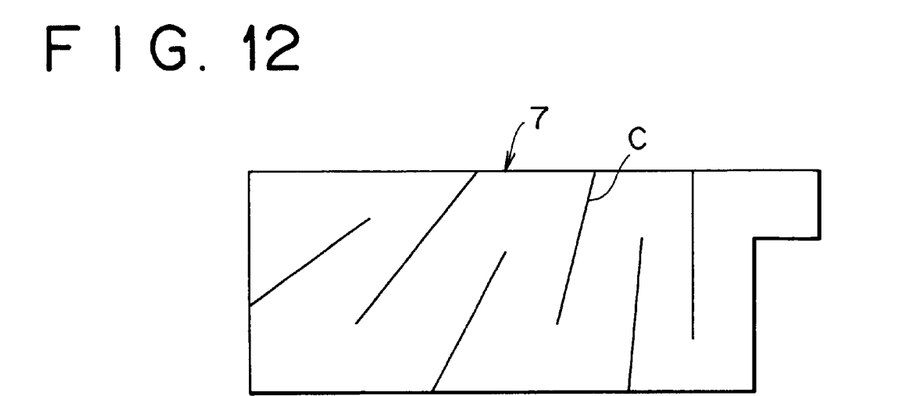
FIG. 12 is a schematic plan view showing how cut lines are made so that winding shown in FIG. 11 is accomplished.

FIG. 11 shows an example in which the battery is wound around a cone B. In this case, the cut lines C are made with sequentially changing slopes, as shown in FIG. 12.

The length of the cut lines should be established within an adequate range.

The cut lines can be made so long as the length of each cut line represented by y is shorter than the distance between two points at which the extension of the cut line crosses both edges of the current collector 7 represented by x. As the length (y) of the cut line increases, the current collector becomes more flexible but decreases in electrical conductivity. Conversely, as the length (y) of the cut line decreases, the current collector has sufficient electrical conductivity but becomes less flexible.

In view of the foregoing, it is desirable that the relation between x and y satisfy the following inequality.

$$0.2 \leq y/x \leq 0.9$$

In the above-mentioned example, the cut lines C are made in the metal current collector 7 of the negative electrode plate 9. Needless to say, the cut lines can be made also in the metal current collector 10 of the positive electrode plate 12. Alternatively, the cut lines can be made in both of them. In the case where two or more assemblies of the negative and positive electrodes are placed on top of the other, it is desirable that the cut lines be made all the metal current collectors but one. If there are more than one metal current collector having no cut lines, the resulting battery has the bridge structure mentioned above.

In the above-mentioned example, the layer of the negative electrode active material 8 (or the positive electrode active material 11) is formed after the cut lines C have been made in the metal current collector 7 (or metal current collector 10). It is also possible to make the cut lines in the electrodes after the layer of the negative electrode active material 8 (or the positive electrode active material 11) has been formed.

The negative electrode active material for the above-mentioned non-aqueous electrolyte battery may be formed from a material which permits the doping and dedoping of lithium. An example of such a material is a carbonaceous material which is hardly graphitized or a carbonaceous material such as graphite. Typical examples include thermally decomposed carbon, coke (pitch coke, needle coke, and petroleum coke), graphites, glassy carbon, burned products from organic polymeric compounds (obtained by burning phenolic resin, furan resin, etc. at an adequate temperature for carbonization), carbon fiber, and activated carbon. Additional examples include polymeric materials such as polyacetylene and polypyrrole, oxides such as $SnO_2$, metallic lithium, and lithium compounds capable of occluding and releasing lithium.

These materials may be mixed with any known binder to form the layer of the negative electrode active material.

The active material for the positive electrode should be formed from an adequate material, such as metal oxide, metal sulfide, and polymer, according to the intended use of the battery. It includes, for example, metal oxides and sulfide not containing lithium, such as $TiS_2$, $MoS_2$, $NbSe_2$, and $V_2O_5$, and lithium compound oxide (such as $Li_xMO_2$ where M denotes at least one transition metal and x is 0.05–1.10 depending on how the battery is charged and discharged). Preferred examples of the transition metal M include Co, Ni, and Mn. Typical examples of the lithium compound oxide are $LiCoO_2$, $LiNiO_2$, $LiNi_yCo_{1-y}O_2$ (where 0<y<1), $LiMn_2O_4$, and $LiMPO_4$ (where M denotes at least one transition metal such as Fe). These lithium compound oxides yield the positive electrode active material which evolves high voltage and is superior in energy density. It is possible to use a plurality of active materials for the layer of the positive electrode active material.

The above-mentioned active material may be mixed with any known binder to form the layer of the positive electrode active material.

The non-aqueous electrolyte used in the present invention is a gel electrolyte or a solid electrolyte. Basically, they are composed of an electrolyte salt, a non-aqueous solvent to solve the electrolyte, and a polymer matrix which holds the non-aqueous solvent.

Examples of the non-aqueous solvent include ethylene carbonate, propylene carbonate, dimethyl carbonate, ethyl methyl carbonate, and diethyl carbonate. They may be used alone or in combination with one another.

Examples of the electrolyte salt include such lithium compounds as $LiPF_6$, $LiBF_4$, $LiN(C_2F_5SO_2)_2$, $LiN(CF_3SO_2)_2$, and $LiCF_3SO_3$. At least one species of them is used.

Examples of the polymer matrix include polyvinylidene fluoride, polyacrylonitrile, polyethylene oxide, polypropylene oxide, and polymethacrylonitrile. Selection from them should be made according to use gel or solid.

EXAMPLES

The examples of the present invention will be described below on the basis of experimental results.

Example 1

First, the negative electrode plate was formed as follows. An active material for the negative electrode was prepared by mixing from 90 pbw of crushed graphite powder and 10 pbw of poly(vinylidene fluoride-co-hexafluoropropylene) as a binder. The resulting mixture was dispersed into N-methyl-2-pyrrolidone to make a slurry. The slurry was applied to one side of a copper foil strip with 15 μm thick as the negative electrode current collector without cut lines. After drying, the coated copper foil strip was pressed by a roll press. Thus there was obtained the desired negative electrode plate.

Then, the positive electrode plate was formed as follows. Lithium carbonate and cobalt carbonate were mixed together in a molar ratio of 0.5:1. The mixture was calcined in the air at 900° C. for 5 hours to give $LiCoO_2$ for the active material. The active material for the positive electrode was prepared by mixing from 90 pbw of the thus obtained $LiCoO_2$, 6 pbw of graphite as the conducting agent, and 4 pbw of poly(vinylidene fluoride-co-hexafluoropropylene). The resulting active material was dispersed into N-methyl-2-pyrrolidone to give a slurry. The slurry was uniformly applied to one side of an aluminum foil strip with 20 μm thick as the positive electrode current collector having cut lines as shown in FIG. 4. After drying, the coated copper foil strip was pressed by a roll press. Thus there was obtained the desired positive electrode plate.

The gel electrolyte was prepared as follows. A solution was prepared from 30 pbw of plasticizer, 10 pbw of poly(vinylidene fluoride-co-hexafluoropropylene), and 60 pbw of diethyl carbonate. This plasticizer is composed of 42.5 pbw of ethylene carbonate (EC), 42.5 pbw of propylene carbonate (PC), and 15 pbw of $LiPF_6$. The resulting solution was uniformly applied (for impregnation) to the negative electrode plate and the positive electrode plate. The coated electrode plate was allowed to stand at room temperature for 8 hours so as to vaporize and remove dimethyl carbonate. Thus there was obtained a gel electrolyte.

The negative electrode and positive electrode, both coated with the above-mentioned gel electrolyte, were press-bonded together, with the sides of the gel electrolyte facing each other. Thus there was obtained a flat battery element with a gel electrolyte.

To the negative electrode of the battery element was attached a nickel lead by ultrasonic welding, and to the positive electrode of the battery element was attached an aluminum lead by ultrasonic welding, as shown in FIG. 1 and FIG. 2.

The battery element obtained in this manner was placed in an exterior package, which is a folded laminate sheet with three sides sealed, as shown in FIG. 1. The leads for the positive and negative electrodes were passed through the exterior package. Thus the desired battery was obtained.

The battery was wound around and fixed to a cylinder as shown in FIG. 3.

Examples 2 to 8

The same procedure as in Example 1 was repeated to prepare a flat battery with a non-aqueous electrolyte, except that changes were made in the current collector in which cut lines were made, the shape of cut lines, and the bent form of the battery as shown in Table 1.

Comparative Example 1

The same procedure as in Example 1 was repeated to prepare a flat battery with a non-aqueous electrolyte, except that no cut lines were made in the current collector.

Evaluation

The battery obtained in each example was tested for bendability, load characteristics, and cycle characteristics.

Bendability was rated by visually examining the bent battery for cracks and other defects.

Load characteristics were rated in the following manner. Each battery was charged with a constant current at a constant voltage for 6 hours to the upper limit of 4.2 V, with the charge rate being 0.5C. Each battery was discharged until the end voltage reached 3 V, with the discharge rate being 0.2C and 3C. The discharge capacity for 3C was calculated assuming that the discharge capacity for 0.2C is 100.

Cycle characteristics were rated in the following manner. Each battery was charged with a constant current at a constant voltage for 2 hours to the upper limit of 4.2 V, with the charge rate being 1C. Each battery was discharged until the end voltage reached 3 V, with the discharge rate being 1C. This charging and discharging cycle was repeated 200 times. After every 5 cycles, the battery was reversed and fixed again to the cylinder or cone. The discharge capacity after 200 cycles was calculated assuming that the discharge capacity after one cycle is 100.

The test results are shown in Table 1.

TABLE 1

|  | Current collector in which cut lines were made | Shape of cut lines | y/x | Bent form of battery | Bend-ability | Capacity at 3C (%) | Capacity after 200 cycles (%) |
| --- | --- | --- | --- | --- | --- | --- | --- |
| Example 1 | Positive electrode | FIG. 4 | 0.6 | FIG. 3 | yes | 87 | 87 |
| Example 2 | Positive electrode | FIG. 5 | 0.6 | FIG. 3 | yes | 88 | 86 |

TABLE 1-continued

| | Current collector in which cut lines were made | Shape of cut lines | y/x | Bent form of battery | Bend-ability | Capacity at 3C (%) | Capacity after 200 cycles (%) |
|---|---|---|---|---|---|---|---|
| Example 3 | Positive electrode | FIG. 6 | 0.6 | FIG. 3 | yes | 86 | 87 |
| Example 4 | Positive electrode | FIG. 8 | 0.6 | FIG. 7 | yes | 87 | 88 |
| Example 5 | Positive electrode | FIG. 10 | 0.6 | FIG. 9 | yes | 85 | 86 |
| Example 6 | Positive electrode | FIG. 12 | 0.6 | FIG. 11 | yes | 88 | 87 |
| Example 7 | Negative electrode | FIG. 4 | 0.6 | FIG. 3 | yes | 87 | 86 |
| Example 8 | Positive and negative electrodes | FIG. 4 | 0.6 | FIG. 3 | yes | 85 | 87 |
| Compar. Example 1 | — | — | — | FIG. 3 | no | 87 | 52 |

It is apparent from Table 1 that the battery having the current collector in which cut lines are made is bendable and has good load characteristics and cycle characteristics.

Study on Length of Cut Lines

Batteries in Examples 9 to 13, which are of the same type as in Example 1, were tested in the same way as above to see how cut lines affect the battery performance differently depending on their length. The length of cut lines was changed as shown in Table 2. The results are shown in Table 2.

TABLE 2

| | Current collector in which cut lines were made | Shape of cut lines | y/x | Bent form of battery | Bend-ability | Capacity at 3c (%) | Capacity after 200 cycles (%) |
|---|---|---|---|---|---|---|---|
| Example 9 | Positive electrode | FIG. 4 | 0.1 | FIG. 3 | no | 88 | 60 |
| Example 10 | Positive electrode | FIG. 4 | 0.2 | FIG. 3 | yes | 90 | 85 |
| Example 11 | Positive electrode | FIG. 4 | 0.6 | FIG. 3 | yes | 87 | 87 |
| Example 12 | Positive electrode | FIG. 4 | 0.9 | FIG. 3 | yes | 83 | 88 |
| Example 13 | Positive electrode | FIG. 4 | 0.98 | FIG. 3 | yes | 55 | 85 |

It is noted that the battery in Example 9, in which the cut line is short (y/x=0.1), is poor in bendability and cycle characteristics.

It is also noted that the battery in Example 13, in which the cut line is long (y/x>0.9), is good in bendability but is poor in load characteristics.

It is also noted that the batteries in Examples 10 to 12, in which the cut line is adequate (y/x=0.2–0.9), is good in bendability as well as load characteristics and cycle characteristics.

As mentioned above, the battery electrode according to the present invention can be bent freely without the layer of the active material peeling off, because it is constructed such that cut lines are made in at least the metal current collector.

Therefore, a non-aqueous battery with this battery electrode can be easily bent without deterioration in battery characteristics, load characteristics and cycle characteristics.

What is claimed is:

1. A battery electrode comprising a metal current collector and a layer of active material formed thereon, wherein said metal current collector has cut lines in the area on which said active material is formed.

2. A battery electrode as defined in claim 1, wherein a ratio of y/x is from 0.2 to 0.9, with y being the total length of a given cut line, and x being the distance across the current collector measured along the direction of the given cut line.

3. A battery electrode as defined in claim 1, wherein the cut lines are made at two or more positions in the bending direction.

4. A battery electrode as defined in claim 1, wherein the cut lines extend halfway alternately from both edges of the metal current collector.

5. A battery electrode as defined in claim 1, wherein the cut lines extend halfway from one edge of the metal current collector.

6. A battery electrode as defined in claim 1, wherein the cut lines are perforations.

7. A non-aqueous electrolyte battering comprising a positive electrode, a negative electrode, a non-aqueous gel electrolyte, a metal current collector and a layer of active material formed thereon, wherein said metal current collector has cut lines in the area on which said active material is formed.

8. A non-aqueous electrolyte battery as defined in claim 7, wherein the non-aqueous electrolyte is a gel electrolyte or a solid electrolyte.

9. A non-aqueous electrolyte battery as defined in claim 7, wherein the positive electrode, negative electrode, and non-aqueous electrolyte are sealed in an exterior package of laminate film.

10. A non-aqueous electrolyte battery as defined in claim 7, wherein the negative electrode contains as the active material at least one species selected from metallic lithium, lithium alloy, and material that permits the doping and dedoping of lithium.

11. A non-aqueous electrolyte battery as defined in claim 10, wherein the material that permits the doping and dedoping of lithium is a carbonaceous material.

12. A non-aqueous electrolyte battery as defined in claim 7, wherein the positive electrode contains as the active material a compound oxide of lithium and transition metal.

* * * * *